(12) United States Patent
Gaidosch

(10) Patent No.: US 6,935,903 B2
(45) Date of Patent: Aug. 30, 2005

(54) MOUNTING RAIL ADAPTER

(75) Inventor: Othmar Gaidosch, Ostfildern (DE)

(73) Assignee: Hirschmann Electronics GmbH & Co. (DE)

( * ) Notice: Subject to any disclaimer, the term of this patent is extended or adjusted under 35 U.S.C. 154(b) by 0 days.

(21) Appl. No.: 10/466,902

(22) PCT Filed: Jan. 24, 2002

(86) PCT No.: PCT/EP02/00709
§ 371 (c)(1),
(2), (4) Date: Dec. 4, 2003

(87) PCT Pub. No.: WO02/060026
PCT Pub. Date: Aug. 1, 2002

(65) Prior Publication Data
US 2004/0115977 A1 Jun. 17, 2004

(30) Foreign Application Priority Data
Jan. 26, 2001 (DE) .......................... 101 03 710

(51) Int. Cl.[7] .................................. H01R 9/26
(52) U.S. Cl. .................... 439/716; 439/94; 439/953
(58) Field of Search .............................. 439/716, 532, 439/94, 953

(56) References Cited
U.S. PATENT DOCUMENTS

| | | | | |
|---|---|---|---|---|
| 4,268,108 A | * | 5/1981 | Debaigt | 439/716 |
| 4,878,859 A | * | 11/1989 | Haller et al. | 439/716 |
| 4,900,275 A | * | 2/1990 | Fasano | 439/716 |
| 4,947,290 A | * | 8/1990 | Ootsuka | 361/807 |
| 5,602,363 A | | 2/1997 | Von Arx | |
| 5,904,592 A | * | 5/1999 | Baran et al. | 439/532 |
| 6,017,251 A | * | 1/2000 | Rittmann | 439/716 |
| 6,157,287 A | * | 12/2000 | Douglass et al. | 337/198 |
| 6,563,697 B1 | * | 5/2003 | Simbeck et al. | 361/668 |

FOREIGN PATENT DOCUMENTS

EP  0 678 947  10/1995

* cited by examiner

Primary Examiner—Neil Abrams
(74) Attorney, Agent, or Firm—Fulbright & Jaworski LLP

(57) ABSTRACT

The present invention relates to an electrical device with a modular construction, comprising at least one equipment module (1), preferably several equipment modules (1), the module(s) being fixed onto a mounting rail (2). To mount or dismount a module (1) from a mounting rail (2) in a simple manner, the module (1) is fixed onto an adapter (3) for mounting on the mounting rail (2). The adapter (3) for one embodiment fulfills its fixing function by use of a bistable snap-on process and is configured in such a way that no tool is required for the manual mounting or dismounting process. This adapter (3) includes an actuator button (8) used to move catch hooks (5) against spring forces to enable mounting and dismounting of the equipment module (1) to the adapter (3) and also to move catch hooks (18) or (23) to enable mounting and dismounting of adapter (3) to the mounting rail (2).

12 Claims, 8 Drawing Sheets

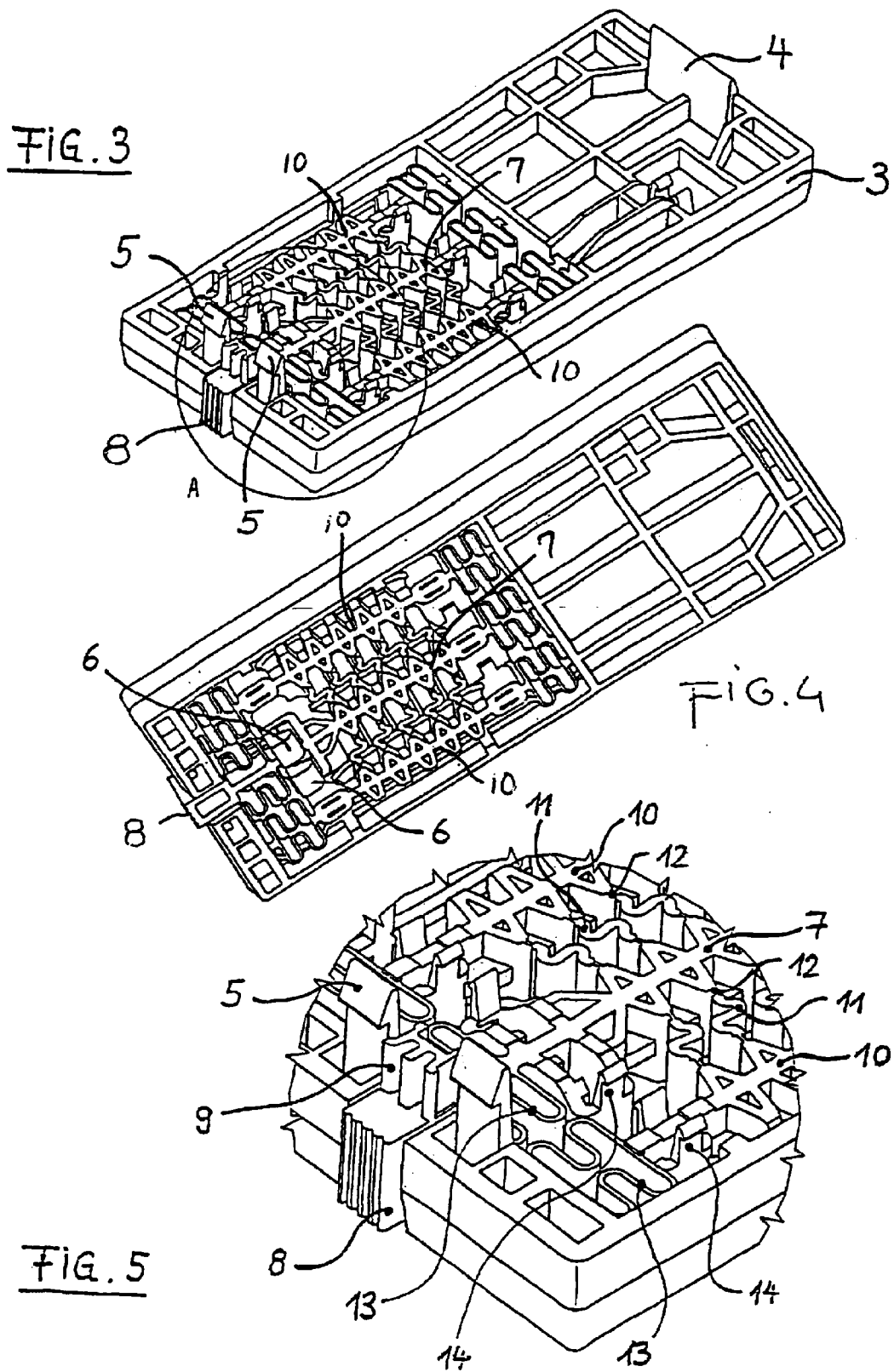

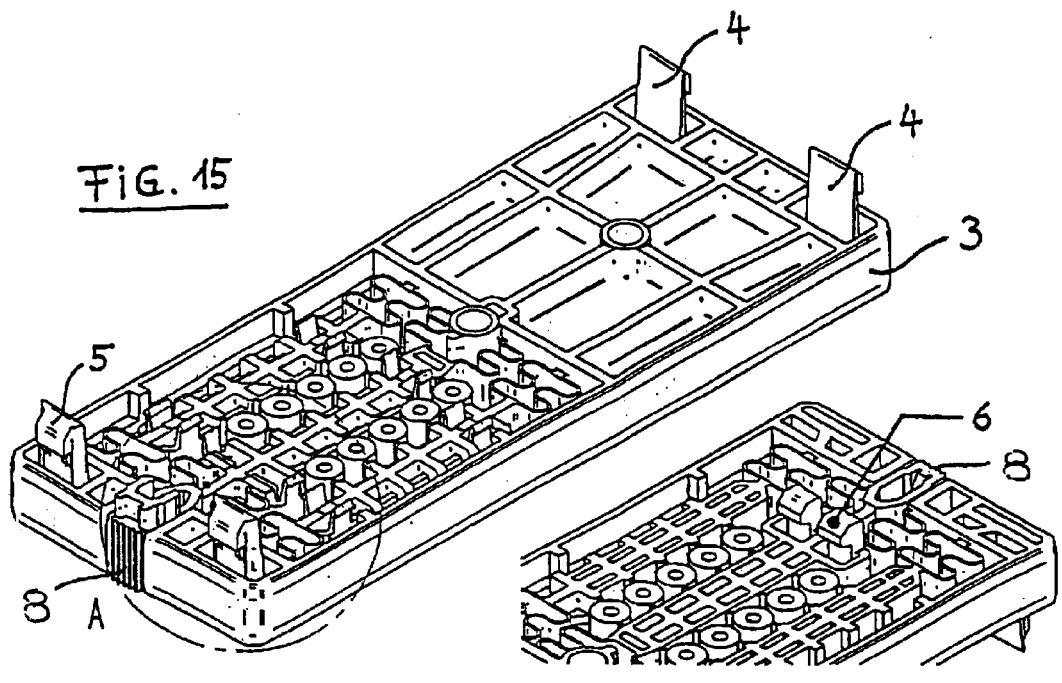
FIG. 15
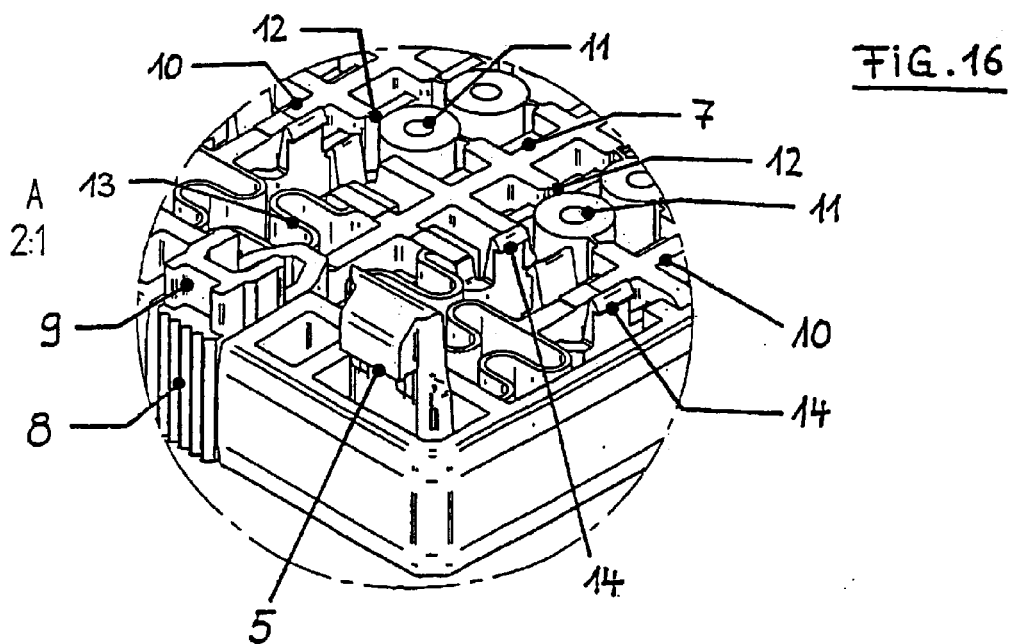
FIG. 16
FIG. 17

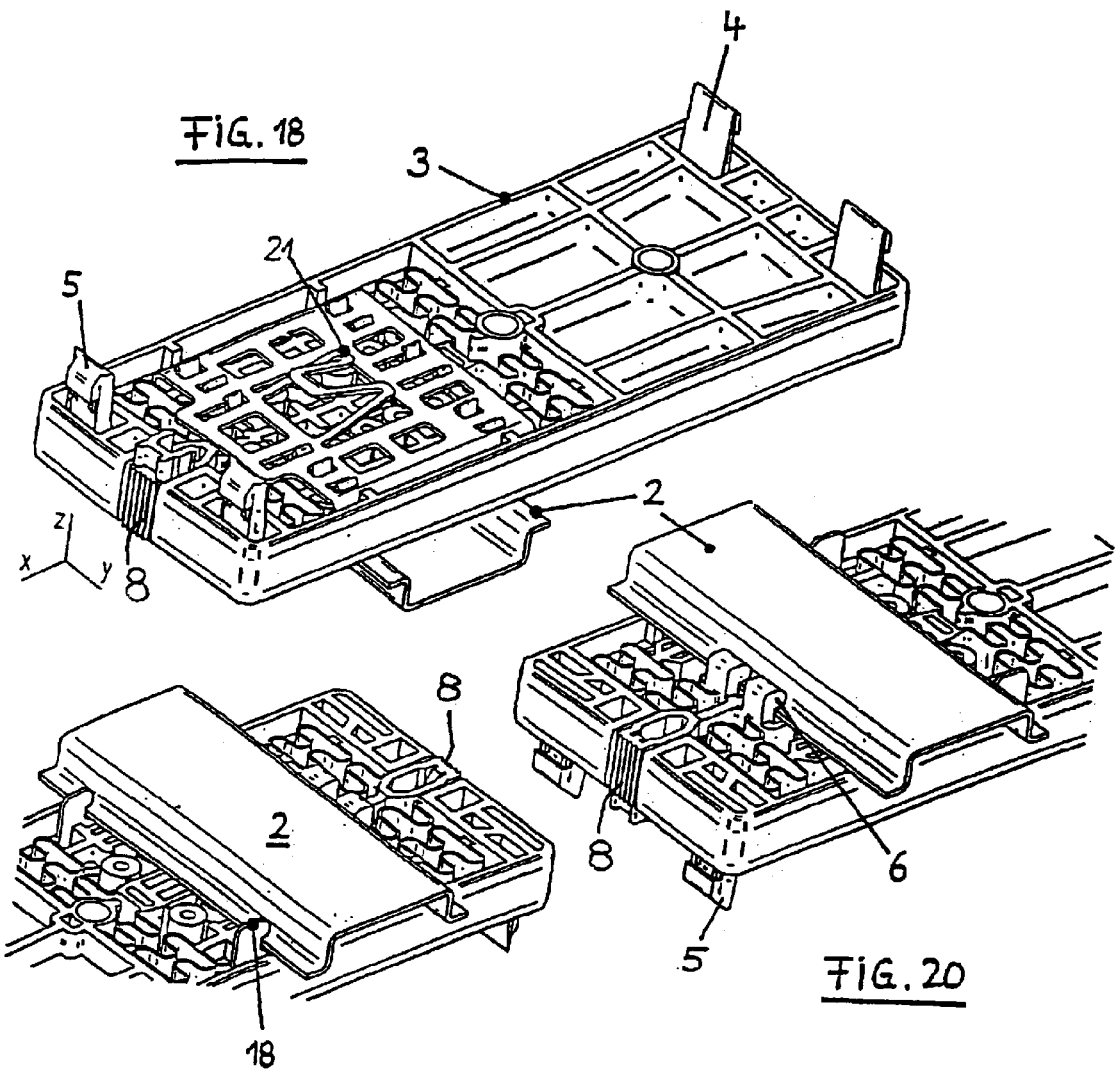

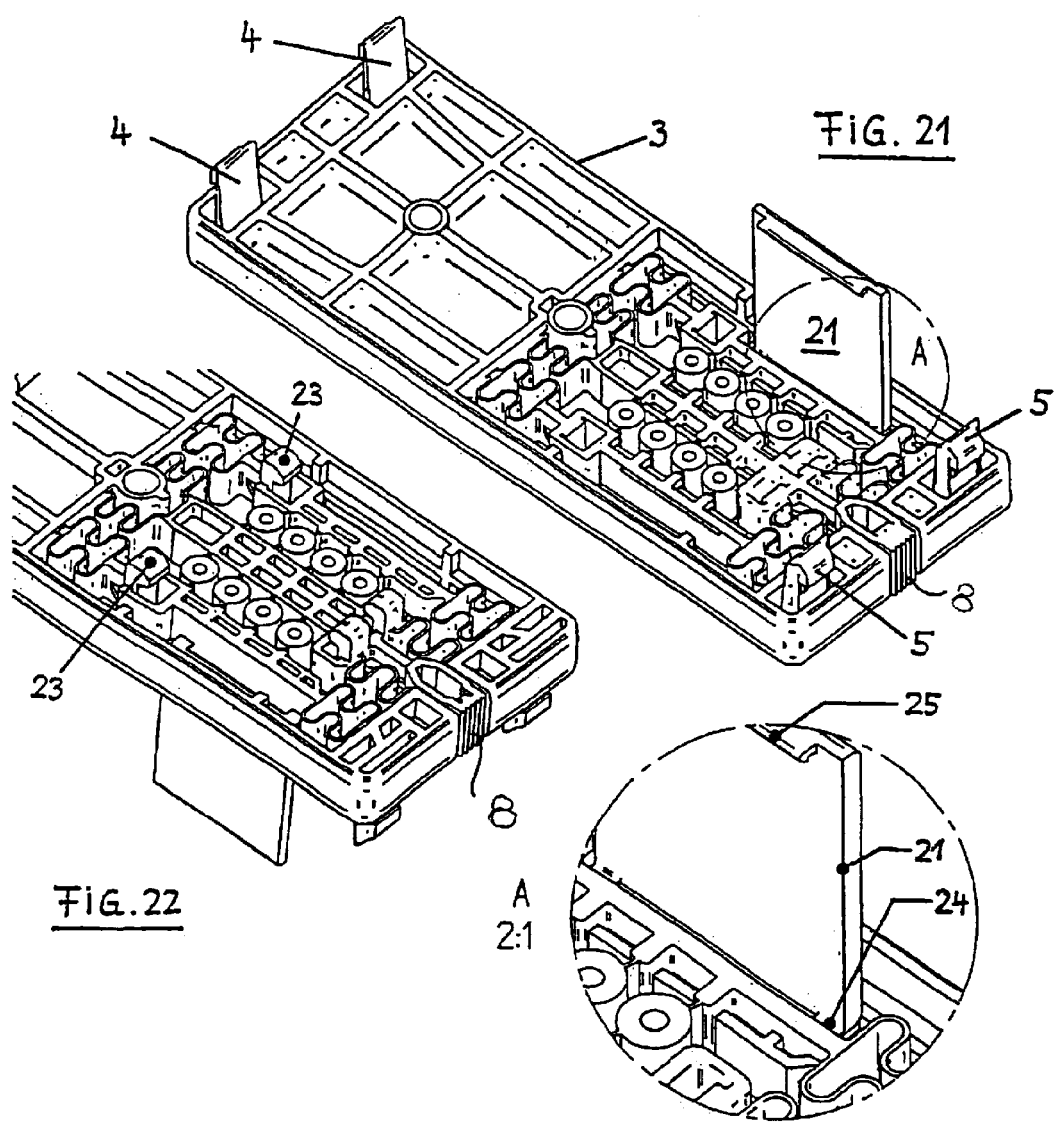

MOUNTING RAIL ADAPTER

TECHNICAL DOMAIN

The invention relates to a modular electrical device which has at least one equipment module, preferably several modules, and at least one module can be mounted on a mounting rail, according to the features of the preamble of claim 1.

PRIOR ART

A modular electrical device is known from EP 0 527 247 B1. Such a device consists of several modules which can be electrically connected between one another and which modules are matched to the respective application. One application is electrical controls, especially memory-programmable controls. To match such a device to the respective application, it is necessary to interconnect a certain number of equipment modules which can be controls, sensors, and/or actuators. For this purpose EP 0 527 247 B1 discloses a flat mounting rail which is angled on its side edges and on which the modules with their one side edge are suspended and are fixed on the opposite side edge on the mounting rail via a screw connection. This type of attachment of modules on the mounting rail has several disadvantages. On the one hand, the modules can tilt when inserted with their one side edge onto the mounting rail so that easy mounting or dismounting is hindered. On the other hand in order to attach the modules on the mounting rail or to detach them from the mounting rail it is necessary to carry a tool for mounting or dismounting. This is a disadvantage with frequent modifications of an electrical device that consists of several equipment modules. Moreover the construction of the electrical device prevents the removal of several modules from being easily made when located next to one another; in particular, when a module is swiveled out, the tilting of the connecting module part which electrically connects to another of the modules located in a row can occur.

DESCRIPTION OF THE INVENTION

The object of the invention is therefore to improve a modular electrical device like the one described above such that easy mounting or dismounting of equipment modules on a mounting rail is enabled.

This object is achieved by the features of claim 1.

It is provided as claimed for the invention that modules can be attached via an adapter to a mounting rail. Attachment of the modules via an adapter on the mounting rail has several advantages. On the one hand, the module itself, independently of the mounting rail, can be detached from it and replaced. Thus rapid replacement or mounting of another module is possible for several modules arranged in a row next to one another. On the other hand, the adapter can be made such that after its mounting on the mounting rail it produces an electrical connection to its neighboring adapter or adapters, while likewise there is an electrical connection between the adapter and the mounted equipment module. Thus, when a module is inserted or replaced there are no problems with electrical connections. In this way, when the module is inserted or replaced after it has been detached from the adapter, it can be removed perpendicular to the adapter upwards, by which removal no damage occurs to the electrical connections at all, especially plug connections between an adapter and a module. Alternatively it also is conceivable that the adapter is an integral component of the equipment module and is permanently connected to it, or the equipment module and the adapter form a unit.

On the other hand, the adapter can be made such that for manual mounting or dismounting a tool is not necessary. This has the advantage that the module can be placed on the mounting rail by hand and can be attached there or vice versa can be detached from the mounting rail by hand. Accordingly, it is not necessary to carry along a tool for mounting or dismounting, by which on the other hand fastening devices for which a tool would be necessary can also be eliminated, thus the simplification of the construction of the modules and handling in their attachment on the mounting rail are enhanced.

In one development of the invention the adapter has various fastening devices, especially catch devices. On the one hand there are catch devices with which an equipment module is held on the adapter. On the other hand, there are catch devices with which the adapter is held on the mounting rail. These increase the flexibility of the overall system since different adapters can be reserved for different mounting rails and different modules. On the other hand, for uniformly configured catch devices on the adapter and also corresponding catch devices on the module and/or the mounting rail an increased diversity of parts is avoided. The catch devices and the snap connections joined to them again enable that connections between modules and adapters can be made without tools on the one hand and adapters and the mounting rail on the other. The fastening devices also can be screw connections or elements of equivalent type action, combinations also being possible.

In one development of the invention at least one of the catch devices, or alternatively all catch devices, are stationary mounted on the adapter. These catch devices which are stationary mounted and are optionally elastic or are made flexible on the adapter form contacts with the corresponding areas of modules or on the mounting rail, especially its side edge which runs lengthwise. Furthermore, other catch devices, especially all other catch devices, are movably mounted on the adapter. In this way, depending on the direction of motion of the movable catch devices, the equipment module can be fixed on the adapter or detached, in exactly the same way as the adapter is fixed on the mounting rail or detached. To move the catch devices there are one or more actuators which act on the respective movable catch devices or groups of them or all of them. In one configuration of the invention there is an actuator for the movable catch devices in order to fix the module on the adapter or to detach it. There is another actuator to move the movable catch devices on the adapter, to fix the adapter on the mounting rail, or to detach it from the latter. In another embodiment there is only one single actuator to move all movable catch devices at the same time, in order to fix the module on the adapter and the adapter on the mounting rail at the same time, or to detach it.

In one development of the invention the movable catch devices are actuated by a spring force. The spring force is applied advantageously in the direction such that when the module is seated on the adapter or the adapter is seated on the mounting rail the movable catch devices are moved out of their rest position against the spring force and after the module is seated on the mounting rail they assume their rest position again in order to fix the module on the adapter or adapters on the mounting rail immovably in their respective positions to one another.

BRIEF DESCRIPTION OF THE DRAWINGS

Possible embodiments of the modular electrical device as claimed for the invention or its adapter are described below and explained using the figures, the invention not being limited to the described and illustrated embodiments.

FIGS. 3 to 5 show detailed views of the adapter;

FIGS. 12 to 23 show alternative embodiments for attachment of the module via the adapter on the mounting rail.

EMBODIMENTS OF THE INVENTION

Figure 1:
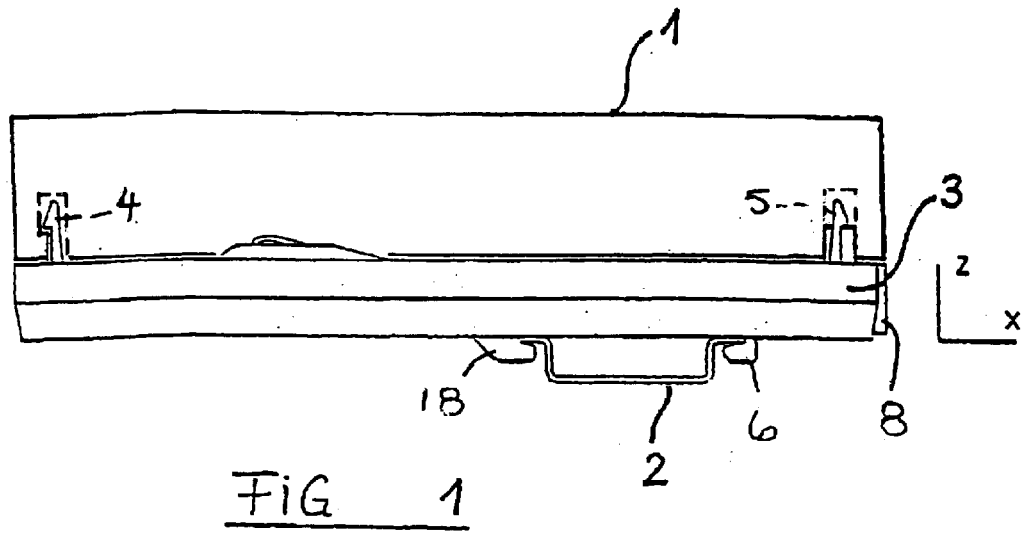
FIG. 1 shows a side view of an equipment module.

FIG. 1 shows in schematic form an equipment module 1 which is for example a control module, a sensor, an actuator, a combination of these components or the like. Several of these modules 1 generally are mounted with their lengthwise sides parallel to one another on a mounting rail 2, preferably a mounting rail made according to German Industry Standard EN 50022 or EN 50023, especially positioned next to one another in order to maintain given positions of the modules 1 among one another. The mounting rail 2 which can be mounted stationary fixes several modules 1 next to one another in their positions. They can be electrically cabled from there, optionally with the aid of connections, among one another.

It also is provided as claimed for the invention that the module 1 can be attached via an adapter 3, especially of plastic, onto the mounting rail 2. Here the adapter 3 first takes over a pure fastening function between the module 1 and the mounting rail 2. In addition, the adapter 3 can assume connection functions, especially electrical connections, between several modules 1. The adapter 3 shown in FIG. 1 is configured such that in the Z direction it is seated from overhead onto the mounting rail 2 and can be fixed there in its position, especially without a mounting or dismounting tool being necessary. The same applies to the module 1 which can be fixed in its position likewise in the Z direction on the adapter 3. Alternative embodiments include those in which the module 1 and the adapter 3 form a unit so that this unit can be mounted in the Z direction on the mounting rail 2 or can be dismounted from it.

Figure 2:
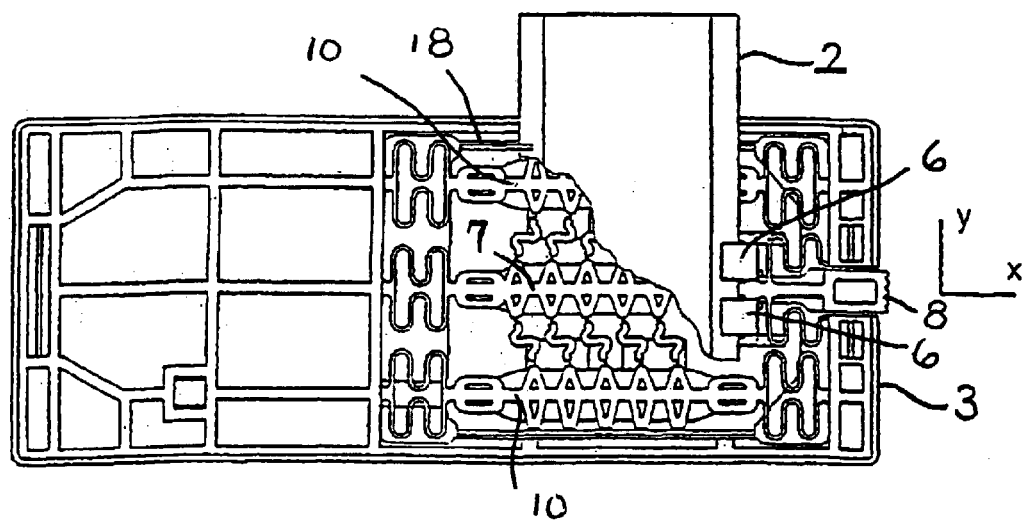
FIG. 2 shows a view of an adapter for the module from underneath.

FIG. 2 shows a bottom view of the adapter 3 without the module 1, and the mounting rail 2 which runs under the adapter 3 as shown in partial section.

FIGS. 3 to 5 show detail views of the adapter 3 according to the present invention. It being shown in FIG. 3 that in the direction of the module 1 there are first catch devices, specifically at least one stationary elastic catch hook 4 and at least one likewise stationary or also alternatively movable elastic catch hook 5. These catch hooks 4 and 5 fit into corresponding recesses on the bottom of the module 1 so that after the catch hooks 4 and 5 catch in the corresponding recesses in the module 1, it is connected permanently to the adapter 3. The capacity for movement of the catch hooks 4 and 5 is detailed below.

FIG. 4 shows the bottom of the adapter 3 pointed in the direction of the mounting rail 2, with catch hooks 6 projecting out of the adapter 3.

FIG. 5 shows the adapter 3 from its top which is pointed in the direction of the bottom of the module 1. The adapter 3 has a middle bridge 7 with an actuator 8 located on its end. Furthermore there is a stop 9 which is connected to it and which can act on the catch hook 5 when the actuator 8 is moved, but need not necessarily do so, by which it can be pushed out of its catch position and the module 1 can be removed from the adapter 3. The middle bridge 7 can be moved in the lengthwise direction of the adapter 3. For detachment of the module 1 from the adapter 3 the catch hooks 5 can be located on a bridge, especially the bridge 7. In addition to the middle bridge 7, there are two side bridges 10 which are guided identically or similarly in the same direction, and which are connected via at least one compression element, especially several compression elements 11, and via pertinent film hinges 12 to the middle bridge 7 in order to produce a spring force. The bridges 7 and/or 10 are attached and guided via elastic guide elements 13 on the frame of the adapter 3. On the side bridges 10 there are in turn catch hooks 14 (discussed below). Thus the two side bridges 10 can be moved in the same way as the middle bridge 7 when push pressure is applied to the actuator 8 or the actuator 8 is pulled. In this case movable catch hooks 18 or 23 (discussed below) come to rest against the side edge of the mounting rail 2.

Figure 6:
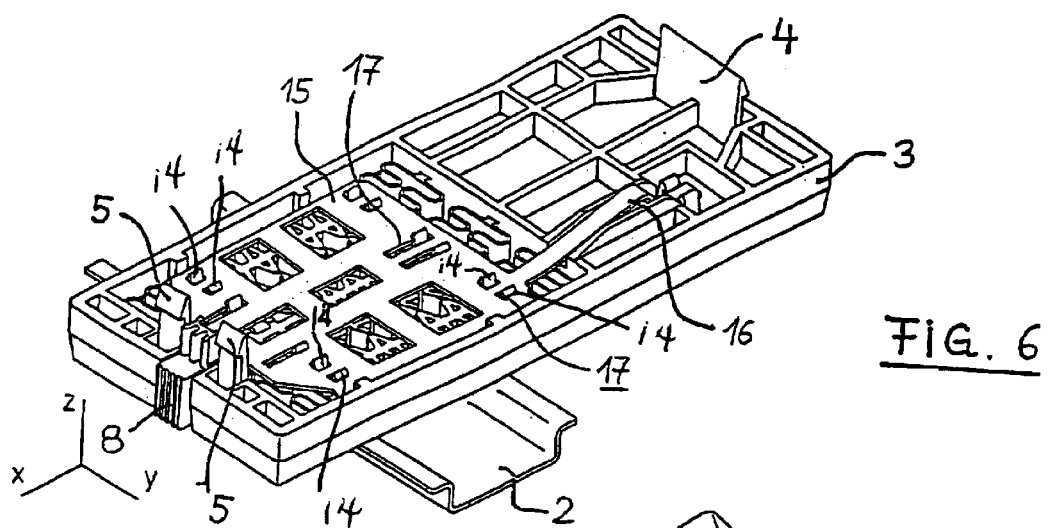
FIGS. 6 to 8 show detailed views of the adapter mounted on a mounting rail.
Figure 7:
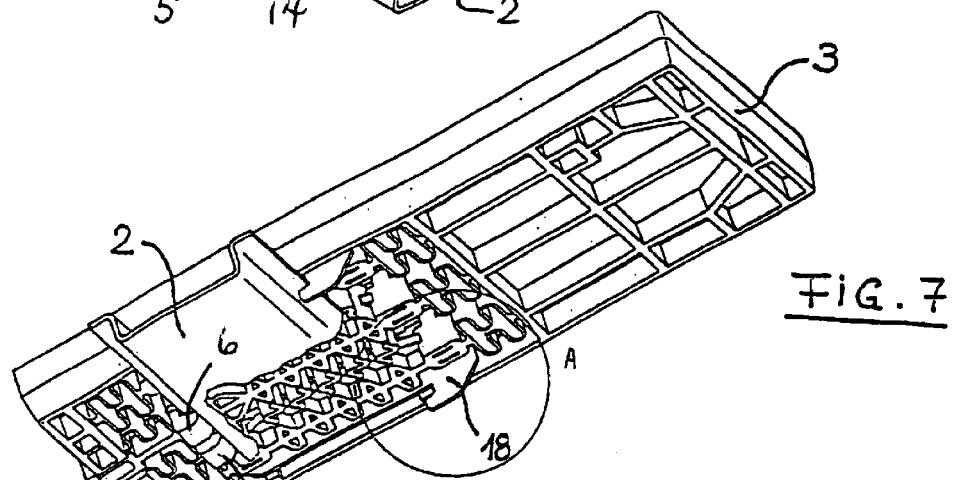
Figure 8:
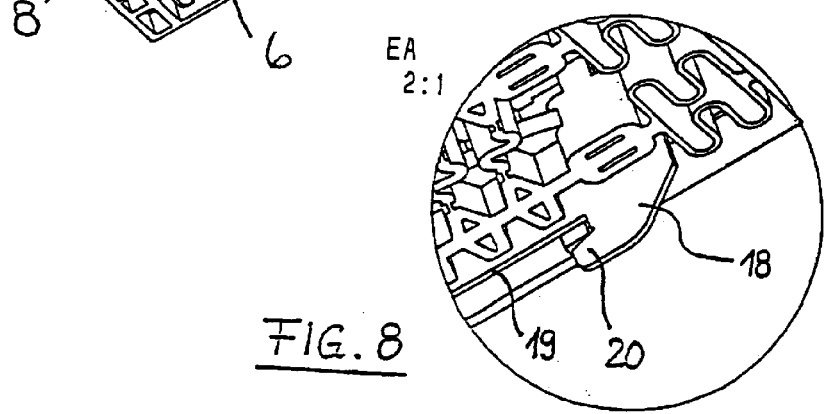

FIGS. 6 to 8 show detail views of the adapter 3 which is mounted on the mounting rail 2. An intermediate plate 15 is placed on the tops of the bridges 7 and 10 and is fixed by the catch hooks 14 of the side bridges 10. Thus no relative movement of the intermediate plate 15 to the bridges is possible. Movement of bridge 10 in the X direction is possible. Optionally the metal intermediate plate 15 is provided with an arm 16, especially an elastic plate, which can enable electrical contact between the mounting rail 2 and the module 1. The intermediate plate 15 has recesses 17 to accept the catch hooks 14 and the latter fit into the recesses and fix the intermediate plate 15 with reference to the bridges 7 and 10.

FIG. 7 shows the bottom of the adapter 3, after the intermediate plate 15 has been connected to the adapter 3, from which it is apparent that the intermediate plate 15 has catch hooks 18 which are pointed in the direction of the mounting rail 2.

FIG. 8 shows the location and the configuration of the catch hooks 18, and specifically that the intermediate plate 15 on its bottom has a lengthwise edge 19 with which it can lie on the top edge of the mounting rail 2, optionally elastically. Furthermore, in the end area of the lengthwise edge 19 there is a projection 20 which forms the catch hook 18 and which corresponds to the angling on the side edges of the mounting rail 2. Thus the catch hook 18 of the intermediate plate 15 can reach behind a lengthwise edge of the mounting rail 2.

The adapter 3 performs with respect to the mounting rail 2 an attachment function that is based on a bistable snapping process. The snapping process for adapter 3 occurs between the middle bridge 7 and the two side bridges 10 which are coupled stiffly to one another via the intermediate plate 15. A snapping force is generated by movement of the actuator 8 in the X direction from the compression elements 11, detachment of the catch hook 6 takes place when the catch hook 18 of the intermediate plate 15 is fixed to be stationary for the time being on the mounting rail 2. Detachment of the catch hooks 18 is consequently caused after the forces from the X direction components, which form in the compression elements 11 have undergone a reversal of direction, at a defined snap point over the path of the actuator 8 or the middle bridge 7 which is rigidly connected to it opposing motion of the side bridges 10 and the intermediate plate 15 which is connected to them in the negative X direction is initiated. The opposing paths of the catch hooks 6 and 18 with respect to the snap point can if necessary be defined via the correspondingly matched stops and/or catches with respect to the stop 9, and these stops can be provided either on the adapter 3 or on the module 1 which is to be attached to it. The catch devices which are necessary for fixing the adapter 3 on the mounting rail 2 after mounting adjoin the mounting rail 2 largely without force in order to avoid twisting within the adapter 3. Only a small force is applied to the mounting rail 2 in order to ensure zero backlash between the adapter 3 and mounting rail 2 (pretensioning).

Figure 9:
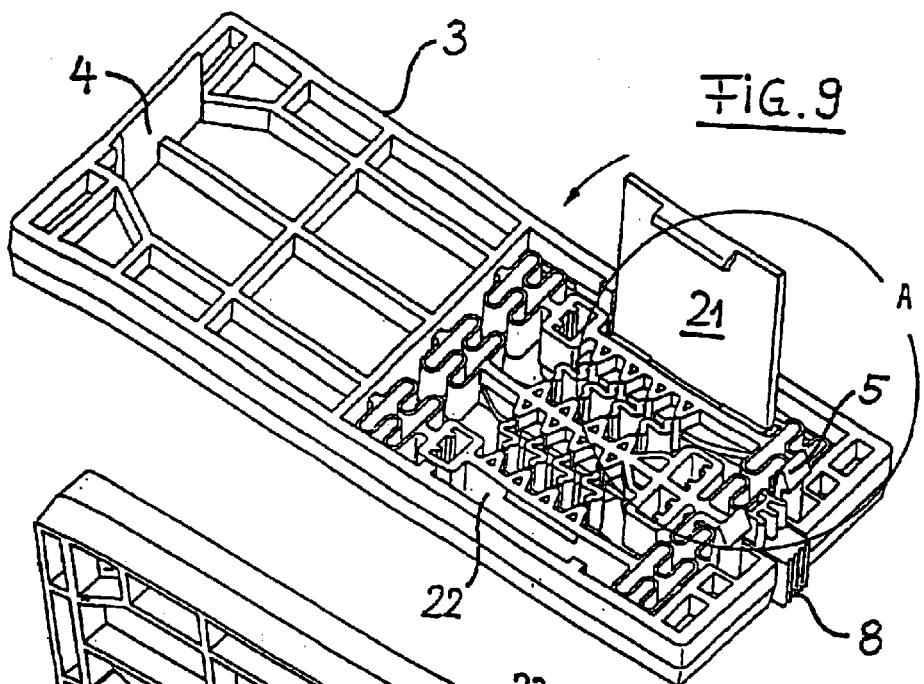
FIGS. 9 to 11 show other detailed views of the adapter.
Figure 10:
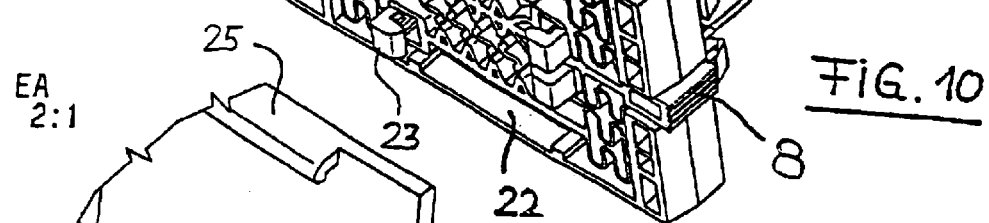
Figure 11:
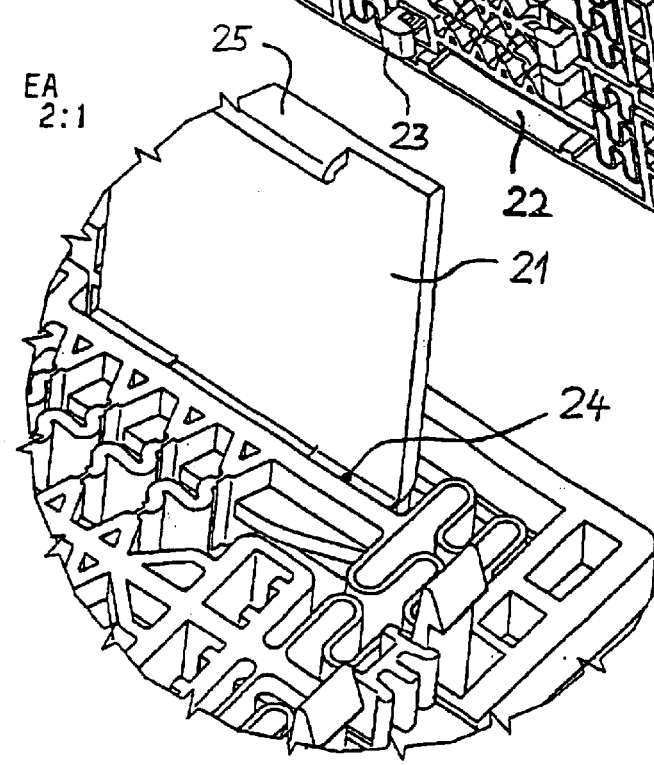
Figure 12:
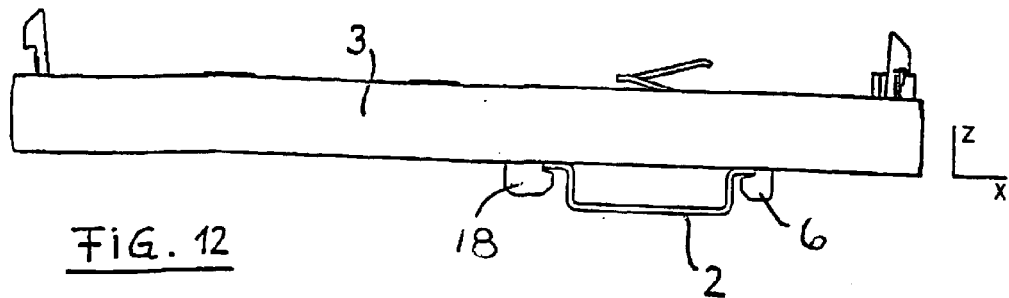
Figure 13:
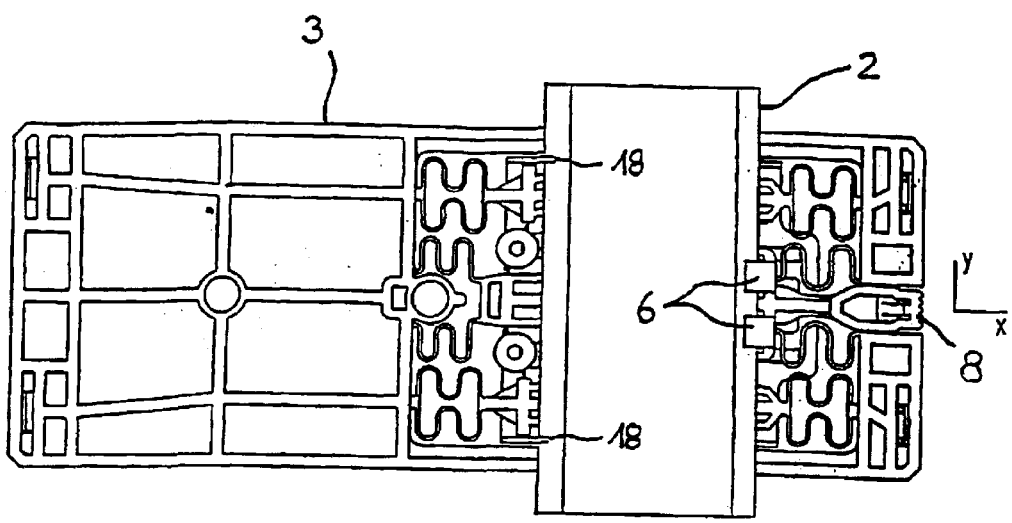
Figure 14:
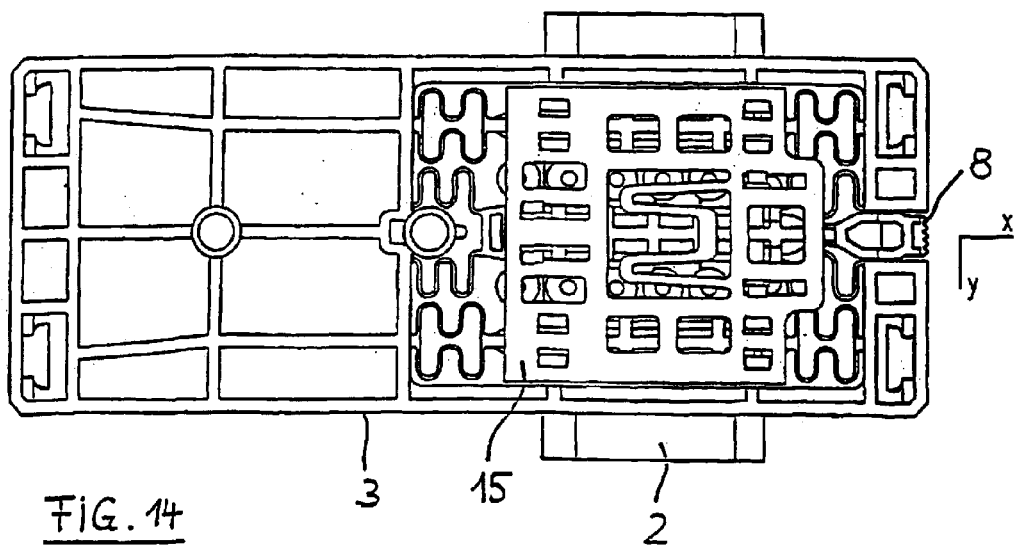

FIGS. 9 to 11 show other detailed views of the adapter 3 which is used especially when there is no electrical connection, but only a pure attachment function between the module 1 and the mounting rail 2 is to be accomplished. Then the adapter 3 can consist integrally of plastic.

There is in turn a mounting plate 21 (of metal or plastic), the adapter 3 furthermore having a side elongated recess 22. The catch hooks 23 which correspond to the catch hooks 18 are not attached to the mounting plate 21 as shown by examining FIG. 10, but are attached to the side bridge and thus are likewise movable. The mounting plate 21 is located on the other side bridge via a folding hinge 24 (or film hinge) and is fixed via a snap element 25 that is plane-parallel to the surface of the bridges on them. Here therefore the catch hooks 23 corresponding to the catch hooks 18 are securely attached to the side bridges 12 (analogously to the catch hook 6 on the middle bridge 7) by an injection process. Stiff coupling of the side bridges 10 is ensured by the mounting plate 21 which is connected on one of the side bridges 10 via a folding hinge 24 and to the opposite side bridge via the corresponding snap element 25.

Advantages of the described approaches are the following:

Opposing motion of the catch hooks 6 and 18 is initiated in both directions, i.e. both when the adapter 3 is attached and also detached from the mounting rail 2 with only one movement of the actuator 8.

Relative to functionality, the connection of the module 1 to the mounting rail 2 represents a very economical two-part or one-part approach.

The adapter 3 can be very easily removed from the mold in only one direction, i.e. it can be easily produced with only two tool halves.

Very simple mounting of the module 1 on the adapter 3 and thus on the mounting rail 2 by snap connections so that mounting or dismounting is possible without tools.

Although the described approaches in terms of construction are designed for a minimum of individual parts, they can of course also be made in several parts according to the same principle, such as for example metallic compression springs instead of compression elements 11, slideways instead of elastic guide elements 13, screw instead of snap connections, and the like.

In addition, FIGS. 12 to 23 show, as do the preceding figures, the same functioning of the previously shown and described structures in different orientations for the attachment of an equipment module 1 via the adapter 3 of the present invention to the mounting rail 2, the already described fastening principle, specifically the bistable snapping process, having been retained. Only the construction of the adapter 3 is optimized with respect to its functionality (especially ease of the movement) and its handling.

As shown in FIGS. 1–7, 9, 10 and 13–21, and as described above an actuator 8 is provided on adapter 3. When this actuator 8 is moved, as also described above, all of bridges 7 and 10 are moved in the same direction as actuator 8 is moved. Extending from bridge 7 are catch hooks 5, and extending from bridges 10 are either attached catch hooks 18 (see FIGS. 1, 2, 7, 8, 12, 13 and 19) or catch hooks 23 (see FIGS. 10 and 22). Movement of catch hooks 5 by movement of actuator 8 fixes or detaches equipment module 1 to or from adapter 3. Simultaneously, movement of catch hooks 18 or catch hooks 23 by movement of actuator 8 fixes or detaches adapter 3 to or from rail 2.

What is claimed is:

1. A modular electrical device comprising;
   at least one equipment module;
   a mounting rail;
   at least one adapter to which said at least one equipment module is removably mounted adjacent a top surface of said at least one adapter, and said at least one adapter also is removably mounted to said mounting rail adjacent a bottom surface of said at least one adapter, said at least one adapter including a first bridge disposed for sliding movement between and parallel to both the top surface and the bottom surface of said at least one adapter; and,
   at least one first catch hook, said first catch hook being disposed from said first bridge.

2. The modular electrical device according to claim 1 further comprising second fastening means disposed from said at least one adapter for removably mounting said at least one adapter to said mounting rail.

3. The modular electrical device according to claim 2, wherein said second fastening means is at least one second catch hook disposed from said at least one adapter.

4. The modular electrical device according to claim 2, wherein said second fastening means is a second catch hook, and said second catch hook is disposed from a second bridge that is disposed for sliding movement between and parallel to both said first and second surfaces of said at least one adapter.

5. The modular electrical device according to claim 1 further comprising a first spring disposed between said at least one adapter and said first bridge, said first spring applies a spring force against said first bridge to provide for movement of said first bridge.

6. The modular electrical device according to claim 4 further comprising a second spring disposed between said at least one adapter and said second bridge, said second spring applies a spring force against said second bridge to provide for movement of said second bridge.

7. The modular electrical device according to claim 3 further comprising a second catch hook that is disposed from said at least one adapter, when said second second catch hook is disposed adjacent said mounting rail to retain said at least one adapter to said mounting rail said second second catch hook is not bent due to relative positions between said at least one adapter and said mounting rail.

8. The modular electrical device according to claim 3 further comprising:
   an intermediate plate disposed between said at least one adapter and said at least one equipment module, wherein said second catch hook is an intermediate plate catch hook that extends from said intermediate plate and said intermediate plate catch hook is disposed to extend from said at least one adapter to mount said at least one adapter to said mounting rail.

9. The modular electrical device according to claim 8, wherein said intermediate plate and said intermediate plate catch hook are electrically conductive so that when said at least one equipment module is mounted on said at least one adapter and when said at least one adapter is mounted on said mounting rail there is an electrical interconnection between said at least one equipment module and said mounting rail.

10. The modular electrical device according to claim 8, wherein at least two intermediate plate catch hooks are disposed from said intermediate plate.

11. A modular electrical device comprising:

at least one equipment module;

a mounting rail;

at least one adapter to which said at least one equipment module is removably mounted adjacent a top surface of said at least one adapter, and said at least one adapter also is removably mounted to said mounting rail adjacent a bottom surface of said at least one adapter;

a first fastening means disposed from said at least one adapter for removably mounting said at least one adapter to said mounting rail;

a second fastening means disposed from said at least one adapter for removably mounting said at least one adapter to said mounting rail;

a first bridge disposed for sliding movement between and parallel to both the top surface and the bottom surface of said at least one adapter;

a second bridge disposed for sliding movement between and parallel to both the top surface and the bottom surface of said at least one adapter;

said first fastening means disposed from said first bride and said second fastening means disposed from said second bridge; and, an actuator disposed from said first bridge so that when force is applied to said actuator all of said first and second bridges and disposed first fastening means and disposed second fastening means are further disposed to be moved together.

12. The modular electrical device according to claim 11 further comprising a first spring and a second spring, said first spring disposed between said at least one adapter and said first bridge, said second spring disposed between said at least one adapter and said second bridge, said first spring and said second spring apply spring forces against said first and second bridges to provide for movement of said first and second bridges and both said first fastening means and said second fastening means toward a stop disposed on said at least one adapter.

* * * * *